US007570021B2

(12) United States Patent
Togashi et al.

(10) Patent No.: US 7,570,021 B2
(45) Date of Patent: Aug. 4, 2009

(54) RECHARGEABLE BATTERY CONTROLLER AND METHOD FOR CONTROLLING OUTPUT OF RECHARGEABLE BATTERY

(75) Inventors: Kouta Togashi, Shizuoka (JP); Toshiaki Nakanishi, Aichi (JP); Takuma Iida, Osaka (JP)

(73) Assignee: Panasonic EV Energy Co., Ltd., Kosai-shi (JP)

( * ) Notice: Subject to any disclaimer, the term of this patent is extended or adjusted under 35 U.S.C. 154(b) by 421 days.

(21) Appl. No.: 11/535,970

(22) Filed: Sep. 27, 2006

(65) Prior Publication Data
US 2007/0075686 A1 Apr. 5, 2007

(30) Foreign Application Priority Data
Sep. 30, 2005 (JP) ............................. 2005-287793

(51) Int. Cl.
*H02J 7/00* (2006.01)

(52) U.S. Cl. .................. 320/130; 320/134; 320/136

(58) Field of Classification Search ................. 320/103, 320/104, 106, 107, 128, 130, 132, 134, 136, 320/149; 307/9.1, 10.1, 10.7; 318/139; 180/65.3; 701/22; 340/636.12, 636.13

See application file for complete search history.

(56) References Cited

U.S. PATENT DOCUMENTS

| 5,955,865 A * | 9/1999 | Koike et al. .................. 320/104 |
| 2001/0026142 A1 * | 10/2001 | Furukawa et al. ........... 320/103 |
| 2002/0113595 A1 * | 8/2002 | Sakai et al. .................. 324/433 |
| 2003/0042866 A1 * | 3/2003 | Minamiura et al. ......... 320/104 |

FOREIGN PATENT DOCUMENTS

| JP | 2002-195138 | 7/2002 |
| JP | 2003-199258 | 7/2003 |
| JP | 2004-166367 | 6/2004 |
| JP | 2005-090234 | 4/2005 |

* cited by examiner

Primary Examiner—Akm E Ullah
Assistant Examiner—M'Baye Diao
(74) Attorney, Agent, or Firm—Workman Nydegger

(57) ABSTRACT

A rechargeable battery controller for controlling output of a rechargeable battery mounted on a vehicle having a power source including an internal combustion engine, a starter motor for starting the internal combustion engine, and a vehicle controller. The rechargeable battery controller includes a control circuit for setting an upper limit for discharge power output by the rechargeable battery in a set period of time and providing the upper limit to the vehicle controller. The control circuit is programmed to reset the upper limit to a value greater than or equal to a power value required to drive the starter motor when a first requirement in which power supply from the rechargeable battery to the starter motor is scheduled and a second requirement in which the upper limit is less than the power value required to drive the starter motor are both satisfied.

7 Claims, 9 Drawing Sheets

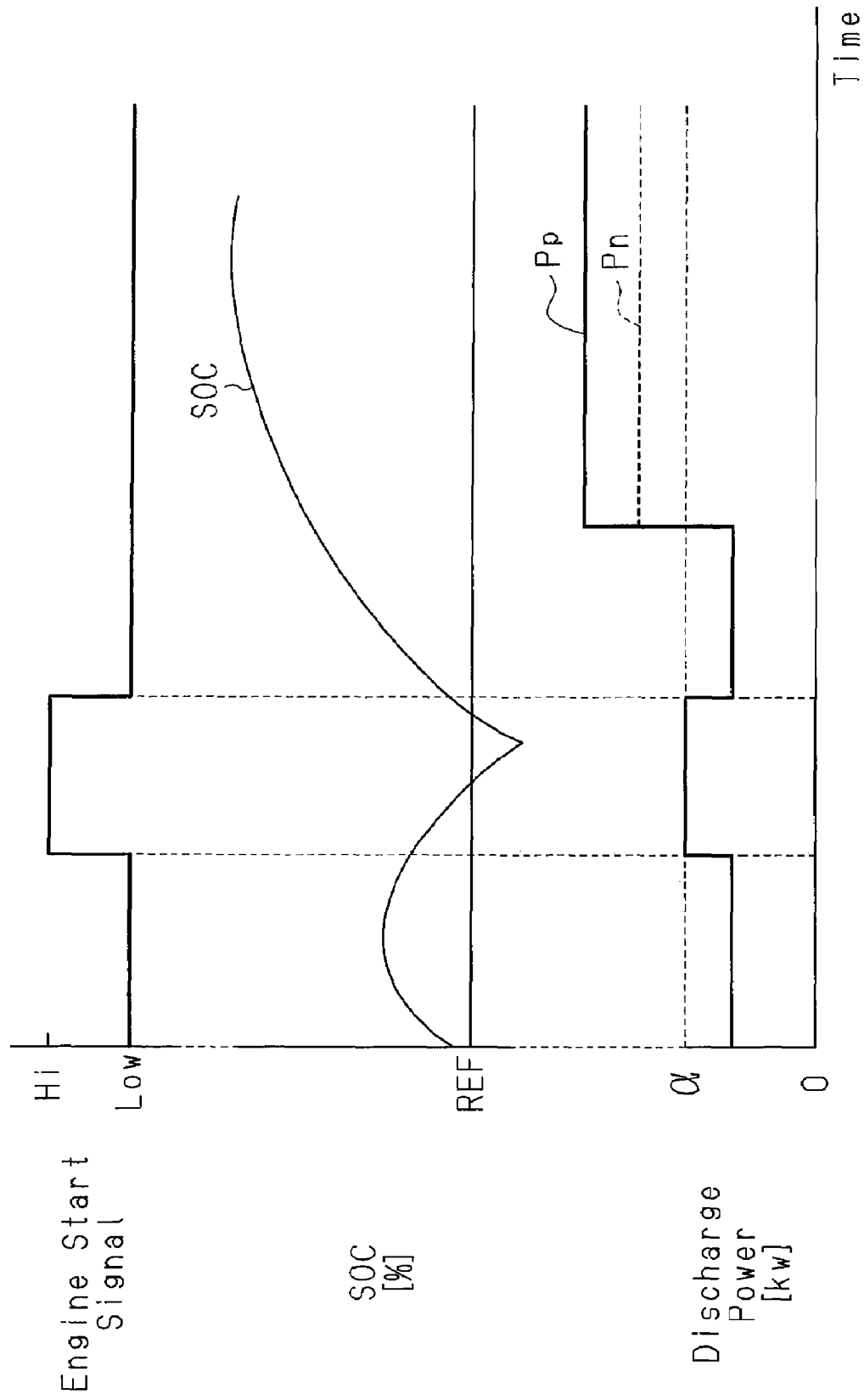

RECHARGEABLE BATTERY CONTROLLER AND METHOD FOR CONTROLLING OUTPUT OF RECHARGEABLE BATTERY

CROSS-REFERENCE TO RELATED APPLICATIONS

This application is based upon and claims the benefit of priority from prior Japanese Patent Application No. 2005-287793, filed on Sep. 30, 2005, the entire contents of which are incorporated herein by reference.

BACKGROUND OF THE INVENTION

The present invention relates to a vehicle rechargeable battery controller and a method for controlling output of a vehicle rechargeable battery.

In recent years, a hybrid electric vehicle (HEV) having an engine and a drive motor as its power sources has been commercialized. A rechargeable battery is mounted on the HEV and supplies power to the drive motor.

When the engine outputs more power than necessary to drive the vehicle, the HEV drives a power generator with the excessive power and charges the rechargeable battery. When the vehicle is braking or decelerating, the HEV drives a motor with the rotating wheels to charge the rechargeable battery with the motor. In this case, the motor is used as a power generator. When the engine outputs insufficient power, the HEV compensates for the lack of power by discharging the rechargeable battery and driving the motor. In this case, the motor is used as a power source for the HEV.

The HEV accumulates energy in the rechargeable battery. Conventional automobiles discharge such energy into the atmosphere as heat. Thus, the energy efficiency of the HEV is higher than the energy efficiency of conventional automobiles. Further, the HEV drastically improves fuel efficiency as compared with conventional automobiles.

In an HEV, the rechargeable battery for supplying power to the drive motor is also used to supply power to a starter motor for starting the engine. However, the discharge voltage of the rechargeable battery greatly decreases at low temperatures of 0° C. or less. At such low temperatures the rechargeable battery may not be able to start the engine. To solve this problem, Japanese Laid-Open Patent Publication No. 2002-195138 describes a rechargeable battery controller (battery ECU) that limits the discharge power of the rechargeable battery to ensure starting of the engine at low temperatures.

More specifically, the battery ECU sets a minimum voltage at which driving of the starter motor with the rechargeable battery is enabled. The discharge voltage of the rechargeable battery is greater than or equal to the minimum voltage when the starter motor is driven. When the discharge voltage of the rechargeable battery decreases to the minimum voltage after the starter motor is driven, the battery ECU controls the rechargeable battery to temporarily stop the supply of power to the starter motor. The battery ECU waits until discharge current generates heat in the battery and accordingly increases the discharge voltage. The battery ECU then permits the rechargeable battery to resume power supply to the starter motor. The battery ECU continues to execute this control until the engine is started. In this manner, the battery ECU of the prior art controls the rechargeable battery to repeatedly start and stop discharging to ensure that the engine can be started under low temperatures.

SUMMARY OF THE INVENTION

A rechargeable battery mounted on an HEV is usually formed by a plurality of series-connected battery cells (cells). The battery cells may have variations in their capacities. As a result, the battery cells may have different discharge capabilities. In such a case, battery cells having a small capacity may become overdischarged and cause pole changing. When the rechargeable battery repeatedly starts and stops discharging within a short period of time, the poles of such battery cells are more likely to be changed. With the technique described in Japanese Laid-Open Patent Publication No. 2002-195138 for repeatedly turning on and off the starter motor, such pole changes are likely to occur more frequently. This would consequently shorten the life of the rechargeable battery.

It is an object of the present invention to provide a rechargeable battery controller and a method for controlling output of a rechargeable battery to ensure that an engine is started under low temperatures.

One aspect of the present invention is a rechargeable battery controller for controlling output of a rechargeable battery mounted on a vehicle having a power source including an internal combustion engine, a starter motor for starting the internal combustion engine, and a vehicle controller. The rechargeable battery control includes a control circuit connectable in communication with the vehicle controller, in which the control circuit sets an upper limit for discharge power output by the rechargeable battery in a set period of time and communicates the upper limit to the vehicle controller. The control circuit resets the upper limit to a value greater than or equal to a power value required to drive the starter motor when a first requirement in which power supply from the rechargeable battery to the starter motor is scheduled and a second requirement in which the upper limit is less than the power value required to drive the starter motor are both satisfied.

A further aspect of the present invention is a method for controlling output of a rechargeable battery mounted on a vehicle having a power source including an internal combustion engine, a starter motor for starting the internal combustion engine, and a vehicle controller. The method includes the steps of (a) setting an upper limit for discharge power output by the rechargeable battery in a set period of time and providing the upper limit to the vehicle controller, (b) determining whether or not power supply from the rechargeable battery to the starter motor is scheduled, (c) determining whether or not the set upper limit is less than a power value required to drive the starter motor, (d) resetting the upper limit set in the step of setting to a value greater than or equal to the power value required to drive the starter motor when it is determined that power supply to the starter motor is scheduled and determined that the set upper limit is less that the power value required to drive the starter motor, and (e) providing the vehicle controller with the upper limit set in the step of setting or the upper limit reset in the step of resetting.

Another aspect of the present invention is a computer program product including computer readable media encoded with program code for controlling output of a rechargeable battery mounted on a vehicle having a driving power source including an internal combustion engine, a starter motor for starting the internal combustion engine, and a vehicle controller. The program code when executed by a computer performing steps includes (a) setting an upper limit for discharge power output by the rechargeable battery in a set period of time and providing the upper limit to the vehicle controller, (b) determining whether or not power supply from the rechargeable battery to the starter motor is scheduled, (c) determining whether or not the set upper limit is less than a power value required to drive the starter motor, (d) resetting the upper limit set in the step of setting to a value greater than or equal to the power value required to drive the starter motor when it is determined that power supply to the starter motor is scheduled and determined that the set upper limit is less that the power value required to drive the starter motor, and (e) providing the vehicle controller with the upper limit set in the step of setting or the upper limit reset in the step of resetting.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 9 shows changes in the state of charge of the rechargeable battery and the upper limits set for the rechargeable battery when the engine is started.

DETAILED DESCRIPTION OF THE PREFERRED EMBODIMENTS

A rechargeable battery controller and a method for controlling output of a rechargeable battery according to a first embodiment of the present invention will now be described with reference to FIGS. 1 to 4.

Figure 1:
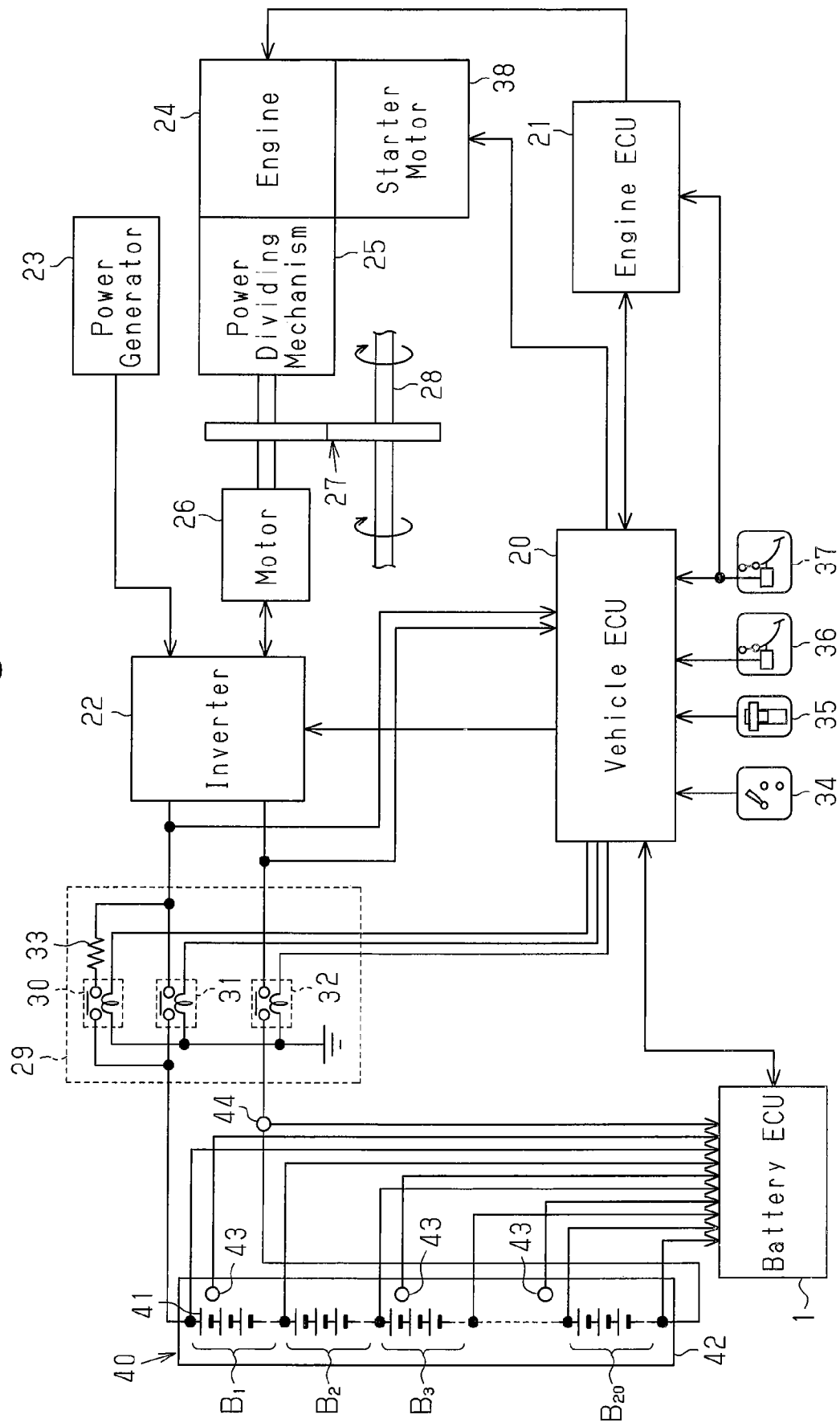
FIG. 1 is a schematic block diagram of a vehicle on which a rechargeable battery controller according to a first embodiment of the present invention is mounted.

FIG. 1 shows an electric vehicle on which a rechargeable battery according to a first embodiment of the present invention is mounted. One example of the electric vehicle is a hybrid electric vehicle (HEV). The electric vehicle includes an internal combustion engine 24 and a motor 26. The internal combustion engine 24 and the motor 26 are power sources for generating power for driving a drive shaft 28. The drive shaft 28 is connected to wheels (not shown). A rechargeable battery 40, or a secondary battery, functions as a power supply source for the motor 26.

The rechargeable battery 40 supplies power to the motor 26 via a relay unit 29 and an inverter 22. The rechargeable battery 40 supplies power to a starter motor 38 for starting the engine via the relay unit 29 and the inverter 22. The inverter 22 converts direct current supplied from the rechargeable battery 40 to alternating current for driving the motor. Wiring connecting the inverter 22 and a starter motor 38 is not shown in FIG. 1.

The engine 24 transmits power to the wheels via a power dividing mechanism 25, reduction gears 27, and the drive shaft 28. The motor 26 transmits power to the wheels via the reduction gears 27 and the drive shaft 28. When the rechargeable battery 40 is required to be charged, some of the power produced by the engine 24 is transmitted to a power generator 23 via the power dividing mechanism 25.

The power generated by the power generator 23 is supplied to the rechargeable battery 40 via the inverter 22 and the relay unit 29 and is used to charge the rechargeable battery 40. When the electric vehicle is decelerating or braking, the motor 26 is used as a power generator. The power generated by the motor 26 is also supplied to the rechargeable battery 40 via the inverter 22 and the relay unit 29 and is used to charge the rechargeable battery 40.

The relay unit 29 includes relays 30 to 32 and a resistor 33. The relay 31 is connected between a positive terminal of the rechargeable battery 40 and a high-potential input terminal of the inverter 22. The relay 32 is connected between a negative terminal of the rechargeable battery 40 and a low-potential input terminal of the inverter 22. The relay 30 is connected in series to the resistor 33 and is connected in parallel to the relay 31. The relay 30 and the resistor 33 are used to precharge a smoothing capacitor (not shown) of the inverter 22 when the vehicle is activated.

The electric vehicle includes controllers, or more specifically, a rechargeable battery controller (battery ECU) 1, a vehicle controller (vehicle ECU) 20, and an engine controller (engine ECU) 21. The engine ECU 21 mainly controls ignition timing and the fuel ejection amount of the engine 24. The battery ECU 1 mainly measures the terminal voltage of the rechargeable battery 40, determines the state of charge (SOC) of the rechargeable battery 40, and determines whether the rechargeable battery 40 has deteriorated, and transmits these results as battery information to the vehicle ECU 20. The structure and function of the battery ECU 1 will later be described in detail with reference to FIG. 2.

The vehicle ECU 20 controls the inverter 22 based on the information provided from the battery ECU 1, the engine ECU 21, and the like to consequently control the driving of the motor 26 and the starter motor 38. The information provided from the engine ECU 21 includes the driving status of the engine 24 and the rotation angle of the crankshaft of the engine 24. The information provided from the battery ECU 1 not only includes the battery information including the SOC of the rechargeable battery 40 but also includes the upper limit of the discharge power generated by the rechargeable battery 40. Information on the depression amount of an accelerator pedal 37, the depression amount of a brake pedal 36, and the gearshift range selected by a gearshift lever 35 is input into the vehicle ECU 20 and used to control the inverter 22.

The vehicle ECU 20 supplies an activation voltage (minimum operating voltage) to the relays 30 to 32 when closing the relays 30 to 32 and stops supplying the activation voltage to the relays 30 to 32 when opening the relays 30 to 32. More specifically, the vehicle ECU 20 closes the relays 30 and 32 when detecting that an ignition (IG) 34 has been turned on. This precharges the smoothing capacitor of the inverter 22. When the precharging is completed, the vehicle ECU 20 closes the relay 31 and supplies power from the rechargeable battery 40 to the motor 26 via the inverter 22. The vehicle ECU 20 stops supplying the activation voltage when detecting that the ignition 34 has been turned off.

When detecting that the ignition 34 has been turned on, the vehicle ECU 20 transmits an ON-detection signal to the battery ECU 1 before supplying the activation voltage. When detecting that the ignition 34 has been turned off, the vehicle ECU 20 stops supplying the activation voltage and transmits an activation voltage suspension signal to the battery ECU 1.

Although not shown in the drawings, a relay for switching the on and off states of the starter motor 38 is arranged on the wiring connecting the starter motor 38 and the inverter 22. The vehicle ECU 20 closes this relay when detecting that the ignition 34 is located at an engine start position by supplying the relay with the activation voltage for switching the on and off states of the starter motor 38. When the relay is closed, power is supplied to the starter motor 38. In this case, the driving power of the starter motor 38 starts the engine. The vehicle ECU 20 provides the battery ECU 1 with an engine start signal when detecting that the ignition 34 is at the engine start position.

In the first embodiment, the rechargeable battery 40 is formed by connecting battery blocks $B_1$ to $B_{20}$ in series. The battery blocks $B_1$ to $B_{20}$ are accommodated in a battery case 42. Each of the battery blocks $B_1$ to $B_{20}$ is formed by electrically connecting two battery modules in series. Each battery module is formed by electrically connecting six cells 11 in series. Nickel-metal hydride batteries or lithium ion batteries may be used as the cells 11. The quantities of the battery blocks, the battery modules, and the cells 11 are not limited to the above-described structure. The structure of the rechargeable battery 40 is also not limited to the above-described structure.

A plurality of temperature sensors 43 are arranged in the battery case 42. The plurality of temperature sensors 43 are arranged in a manner that a temperature sensor 43 is provided for each battery block group including battery blocks having temperatures that are relatively the same or for each battery groups including one battery block when the battery blocks have different temperatures. The grouping of the battery blocks is based on temperatures measured in advance through experiments or the like.

Figure 2:
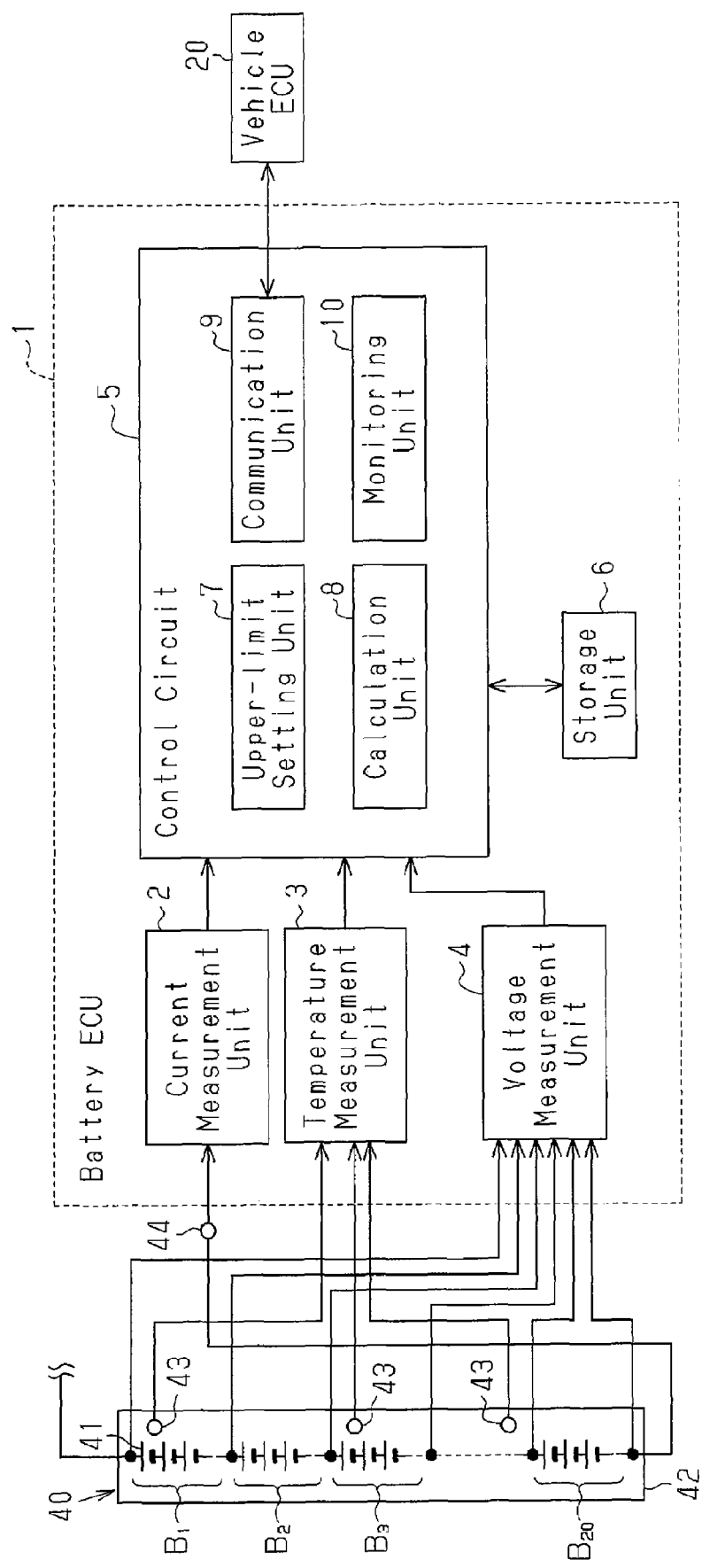
FIG. 2 is a schematic block diagram of the battery ECU shown in FIG. 1.

The structure of the rechargeable battery controller according to the first embodiment will now be described with reference to FIG. 2. As shown in FIG. 2, the battery ECU 1 mainly includes a current measurement unit 2, a voltage measurement unit 4, a temperature measurement unit 3, a control circuit 5, and a storage unit (memory) 6.

The voltage measurement unit 4 measures the terminal voltage of the rechargeable battery 40. In the first embodiment, the voltage measurement unit 4 measures terminal voltages $Vu_1$ to $Vu_{20}$ of the battery blocks $B_1$ to $B_{20}$. The voltage measurement unit 4 generates voltage data specifying the terminal voltages $Vu_1$ to $Vu_{20}$ and provides the voltage data to the control circuit 5. The voltage data is supplied to the control circuit 5 by the voltage measurement unit 4 at a preset frequency. The control circuit 5 stores the voltage data in the storage unit 6.

The current measurement unit 2 measures a current value I of current of the rechargeable battery 40 when the rechargeable battery 40 is being charged or discharged. In the first embodiment, the current measurement unit 2 converts an analog signal provided from a current sensor 44 to a digital signal. Based on the digital signal, the current measurement unit 2 generates current data specifying the current value I of the current input to the rechargeable battery 40 when the rechargeable battery 40 is charged or current data specifying the current value I of the current supplied from the rechargeable battery 40 when the rechargeable battery 40 is discharged. The current measurement unit 2 outputs the generated current data to the control circuit 5. The current measurement unit 2 generates current data indicating a negative value when the rechargeable battery 40 is charged and generates current data indicating a positive value when the rechargeable battery 40 is discharged. The current data is also provided to the control circuit 5 by the current measurement unit 2 at a preset frequency. The control circuit 5 also stores the current data into the storage unit 6.

The temperature measurement unit 3 measures the battery temperature of the rechargeable battery 40. In the first embodiment, the temperature measurement unit 3 converts an analog signal provided from the temperature sensor 43 of each battery block group to a digital signal. Based on the digital signal, the temperature measurement unit 3 generates temperature data specifying the battery temperature for each battery block group and provides the temperature data to the control circuit 5. The temperature data is also provided at a preset frequency from the temperature measurement unit 3 to the control circuit 5. The control circuit 5 stores the temperature data in the storage unit 6.

The control circuit 5 includes a upper-limit setting unit 7, a calculation unit 8, a communication unit 9, and a monitoring unit 10. The upper-limit setting unit 7 sets an upper limit of the discharge power that can be output by the rechargeable battery 40 within a set period of time. In the first embodiment, the upper-limit setting unit 7 sets two upper limits, that is, a short-term output upper limit Pp and a long-term output upper limit Pn. The short-term output upper limit Pp and the long-term output upper limit Pn set by the upper-limit setting unit 7 are stored in the storage unit 6 as short-term output information and long-term output information, respectively.

The short-term output upper limit Pp represents an upper-limit of the discharge power that can be output by the rechargeable battery 40 within a short set period of time, such as one or two seconds. The short-term output upper limit Pp is used to limit the discharge output of the rechargeable battery 40 when the rechargeable battery 40 is required to be discharged to generate a high output in a short period of time, such as when the vehicle starts driving, a gearshift change is made, or the engine is started. The long-term output upper limit Pn represents an upper-limit of the discharge power that can be output by the rechargeable battery 40 for a period of time, such as about ten seconds. The long-term output upper limit Pn is used to limit the discharge output of the rechargeable battery 40 when, for example, the vehicle is normally driven.

In the first embodiment, the upper-limit setting unit 7 sets the short-term output upper limit Pp and the long-term output upper limit Pn using two-dimensional maps, the parameters of which are the battery temperature and the SOC. More specifically, in each two-dimensional map, the vertical axis (or horizontal axis) represents the battery temperature and the horizontal axis (or vertical axis) represents the SOC, and the optimum upper limits for the battery temperature and the SOC are indicated at intersections in the vertical axis and the horizontal axis. Such two-dimensional maps for the short-term output upper limit Pp and the long-term output upper limit Pn are generated in advance based on experiments and are stored in the storage unit 6. The upper-limit setting unit 7 locates the lowest battery temperature in the battery temperatures of the battery block groups based on the temperature data. Then, the upper-limit setting unit 7 sets the optimum short-term output upper limit Pp and optimum long-term output upper limit Pn based on the lowest battery temperature, the SOC estimated by the calculation unit 8, and the two-dimensional maps.

Figure 3:
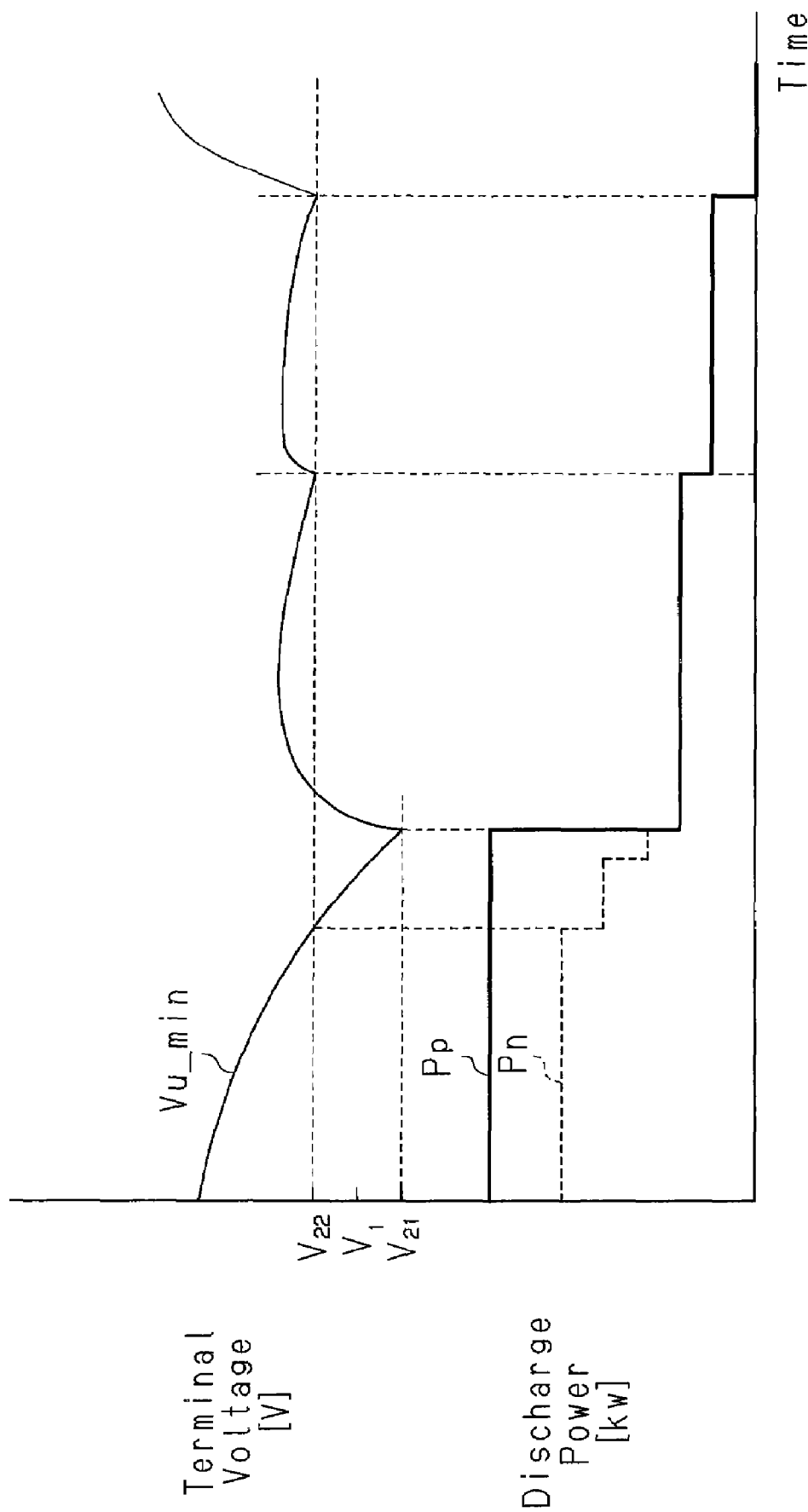
FIG. 3 shows changes in the terminal voltage of the rechargeable battery and the upper limits set for the rechargeable battery when an upper limit lowering process is performed.

When the terminal voltage of the rechargeable battery 40 decreases after the vehicle starts to operate (after the engine is started), the upper-limit setting unit 7 lowers the upper limits to suppress the decrease in the terminal voltage of the rechargeable battery 40. This control will be described with reference to FIG. 3. FIG. 3 shows changes in the terminal voltage of the rechargeable battery and the upper limits set for the rechargeable battery when an upper limit lowering process is performed.

As shown in FIG. 3, when setting the short-term output upper limit Pp and the long-term output upper limit Pn, the upper-limit setting unit 7 sets a first reference voltage, or a relatively low reference voltage $V_{21}$, for the short-term output upper limit Pp and sets a second reference voltage, or a relatively high reference voltage $V_{22}$, for the long-term output upper limit Pn. The upper-limit setting unit 7 locates the minimum terminal voltage Vu_min from the terminal voltages $Vu_1$ to $Vu_{20}$ measured for the battery blocks. Then, the upper-limit setting unit 7 compares the minimum terminal voltage Vu_min with the first reference voltage $V_{21}$ and with the second reference voltage $V_{22}$. This comparison is performed constantly or in fixed intervals.

When the comparison shows that the minimum terminal voltage Vu_min has decreased to the second reference voltage $V_{22}$, the upper-limit setting unit 7 resets the long-term output upper limit Pn to a value smaller than the present value of the long-term output upper limit Pn. When lowering the long-term output upper limit Pn, the upper-limit setting unit 7 also rewrites the long-term output information.

When the comparison shows that the minimum terminal voltage Vu_min has decreased to the first reference voltage $V_{21}$, the upper-limit setting unit 7 resets the short-term output upper limit Pp to a value smaller than the present value of the short-term output upper limit Pp. When lowering the short-term output upper limit Pp, the upper-limit setting unit 7 also rewrites the short-term output information.

The storage unit 6 stores a map showing the relationship between each temperature and the optimum first reference voltage $V_{21}$ and the optimum second reference voltage $V_{22}$. The upper-limit setting unit 7 locates the lowest battery temperature and sets the first reference voltage $V_{21}$ and the second reference voltage $V_{22}$ using the map and the lowest battery temperature. The map may be generated to reflect the performance of the rechargeable battery 40 or the load on the rechargeable battery 40 based on the results of discharging experiments conducted in advance.

In this manner, the upper-limit setting unit 7 lowers the short-term output upper limit Pp and the long-term output upper limit Pn when the terminal voltage of the rechargeable battery 40 decreases. This suppresses the decrease in the terminal voltage of the rechargeable battery 40. However, as shown in FIG. 3, the upper-limit setting unit 7 further lowers the short-term output upper limit Pp and the long-term output upper limit Pn when the terminal voltage of the rechargeable battery 40 does not increase. Although not shown in FIG. 3, the upper-limit setting unit 7 raises the short-term output upper limit Pp and the long-term output upper limit Pn when the minimum terminal voltage Vu_min increases sufficiently.

Figure 4:
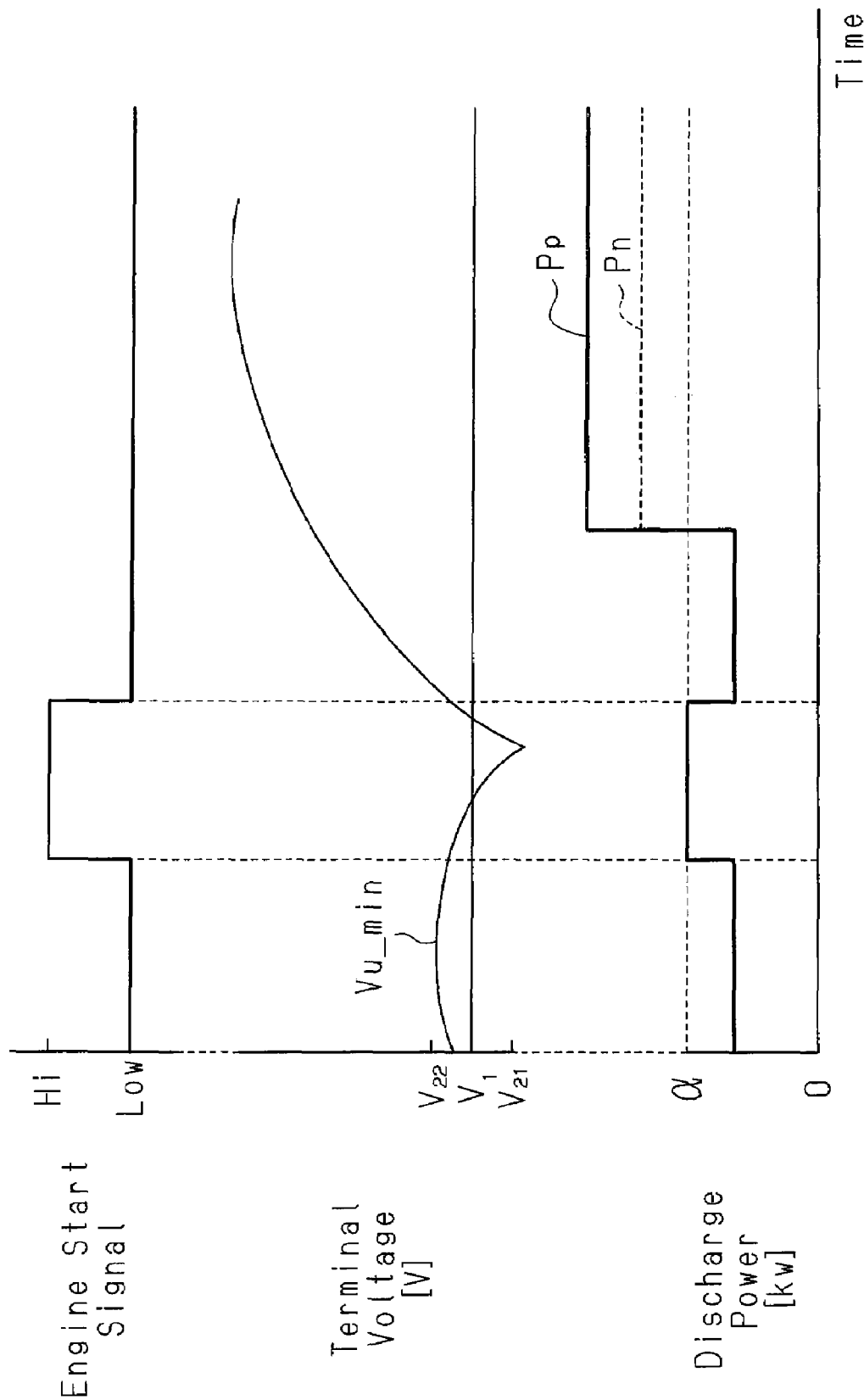
FIG. 4 shows changes in the terminal voltage of the rechargeable battery and the upper limits set for the rechargeable battery when the engine is started.

To further ensure that the engine is started at low temperatures, the upper-limit setting unit 7 resets (raises) the set upper limits if the first and second requirements described below are satisfied when starting the engine. In the first embodiment, the short-term output upper limit Pp is reset. This control will be described with reference to FIG. 4. FIG. 4 shows changes in the terminal voltage of the rechargeable battery and the upper limits set for the rechargeable battery when the engine is started.

The first requirement is that power supply from the rechargeable battery 40 to the starter motor 38 (refer to FIG. 1) is scheduled. In the first embodiment, the upper-limit setting unit 7 determines that the first requirement is satisfied when receiving an engine start signal from the vehicle ECU 20. In this case, the upper-limit setting unit 7 sets an engine start flag ON (FLG=1). In the first embodiment, the logic level of the engine start signal being switched from a low level to a high level as shown in FIG. 4 indicates that the engine start signal has been output.

The second requirement is that the set upper limit is less than a power value α, which is required to drive the starter motor 38 (refer to FIG. 4). In such a state, due to the limited output, the engine is difficult to start. In the first embodiment, when comparing the short-term output upper limit Pp and the power value α, the upper-limit setting unit 7 determines that the second requirement is satisfied when the short-term output upper limit Pp is less than the power value α. The power value α is obtained in advance through experiments and stored in the storage unit 6.

When the first and second requirements are satisfied, the upper-limit setting unit 7 resets the short-term output upper limit Pp and raises the short-term output upper limit Pp to a value greater than or equal to the power value α, which is required to drive the starter motor as shown in FIG. 4. In this case, the upper-limit setting unit 7 rewrites the short-term output information. In the example shown in FIG. 4, the upper-limit setting unit 7 sets the short-term output upper limit Pp to be equal to the power value α. This further ensures that the engine is started even under low temperatures.

The communication unit 9 outputs the short-term output upper limit Pp and the long-term output upper limit Pn to the vehicle ECU 20 that is mounted on the vehicle. In the first embodiment, the communication unit 9 provides the short-term output information and the long-term output information that is stored in the storage unit to the vehicle ECU 20. The short-term output information and the long-term output information are provided to the vehicle ECU 20 at a preset frequency or whenever the upper limits are lowered or raised.

When the short-term output information and the long-term output information are provided, the vehicle ECU 20 is constrained by the short-term output upper limit Pp and the long-term output upper limit Pn when using the rechargeable battery 40. More specifically, the vehicle ECU 20 drives the motor 26 (refer to FIG. 1) and the starter motor 38 (refer to FIG. 1) with the rechargeable battery 40 within the range of the short-term output upper limit Pp specified by the short-term output information or within the range of the long-term output upper limit Pn specified by the long-term output information.

The monitoring unit 10 monitors power supply from the rechargeable battery 40 to the starter motor 38 (refer to FIG. 1) to prevent deterioration of the rechargeable battery 40 caused by excessive power supply to the starter motor 38. More specifically, the monitoring unit 10 monitors at least one of the number of times power supply from the rechargeable battery 40 to the starter motor 38 occurs (power supply occurrences), the time for each power supply (power supply time), and the time elapsed from when the starter motor 38 is first supplied with power (elapsed time).

In the first embodiment, the monitoring unit 10 monitors each of the power supply occurrences, the power supply time for each power supply occurrence, and the elapsed time. The monitoring unit 10 includes a timer for measuring the power supply time. An upper limit is preset for each of the power supply occurrences, the power supply time for each power supply occurrence, and the elapsed time. The set upper limits are stored in the storage unit 6. The monitoring unit 10 compares the measured power supply occurrences, the measured power supply time for each power supply occurrence, and the measured elapsed time with the corresponding upper limits. When any of the measured values exceeds the corresponding upper limit, the monitoring unit 10 stops supplying power to the starter motor 38.

The calculation unit 8 estimates the SOC of the rechargeable battery 40. The estimated SOC is provided by the communication unit 9 to the vehicle ECU 20. In the first embodiment, the calculation unit 8 estimates a first SOC based on an accumulated capacitance Q of the rechargeable battery 40. The calculation unit 8 also estimates a second SOC based on a charging and discharging history of the rechargeable battery 40. The calculation unit 8 calculates the difference between the first SOC and the second SOC, corrects the first SOC based on the calculated difference, and sets the corrected first SOC as the SOC of the rechargeable battery 40.

More specifically, the first SOC is estimated in the following procedure. First, the calculation unit 8 reads current data stored in the storage unit 6 and obtains the current value I. When the obtained current value I is a value indicating a charging current (−), the calculation unit 8 multiplies the current value I by the charging efficiency. Next, the calculation unit 8 accumulates the obtained current value I (product in the case of charging) for a set period of time to calculate the accumulated capacitance Q. The calculation unit 8 further calculates the difference between the accumulated capacitance Q and the capacity of the rechargeable battery 40 that is in a fully charged state, which is calculated in advance based on experiments. The calculation unit 8 then calculates the ratio of the accumulated capacitance Q to the capacity of the rechargeable battery 40 in the fully charged state. The calculation unit 8 uses the calculated ratio (%) as the estimated first SOC.

The second SOC is estimated in the following procedure. First, for each battery block, the calculation unit 8 obtains sets of the voltage value of the terminal voltage and the current value I of the charging and discharging current based on the voltage data provided from the voltage measurement unit 4 and the current data provided from the current measurement unit 2 within a predetermined time period whenever charging and discharging occurs. The obtained sets of voltage and current data are stored in the storage unit 6 as the charging and discharging history.

Next, from the sets of voltage and current data for each battery block stored in the storage unit 6, the calculation unit 8 selects a voltage and current data of a representative battery block. Sets of voltage and current data including the highest or lowest value are excluded, and a set of voltage and current data having average values is selected. The calculation unit 8 further calculates a linear approximation line (V-I linear approximation line) from the selected representative set of data using a regression analysis method. The calculation unit 8 further obtains the V intercept of the V-I linear regression line, and sets the V intercept as a no-load voltage OCV of the representative battery block.

Next, the calculation unit 8 estimates a polarization voltage of the rechargeable battery 40 based on a change amount ΔQ per unit time of the accumulated capacitance Q. More specifically, the calculation unit 8 performs a time delay process and an averaging process on the change amount ΔQ to eliminate change components corresponding to unnecessary high-frequency components and yield a change amount ΔQ'. Further, the calculation unit 8 specifies the polarization voltage referring to the calculated change amount ΔQ' and the lowest battery temperature. The calculation unit 8 also refers to a two-dimensional map of which vertical axis (or horizontal axis) represents the temperature and horizontal axis (or vertical axis) represents the change amount ΔQ'. The two-dimensional map shows polarization voltages at intersections in the vertical axis and the horizontal axis. The calculation unit 8 estimates the specified polarization voltage as the polarization voltage of the rechargeable battery 40. The two-dimensional map is also stored in the storage unit 6.

Next, the calculation unit 8 subtracts the estimated polarization voltage from the no-load voltage OCV of the representative battery block and calculates the electromotive force of the representative battery block. Further, the calculation unit 8 specifies the SOC by referring to the calculated electromotive force and the lowest battery temperature and a two-dimensional map of which vertical axis (or horizontal axis) represents the temperature and horizontal axis (or vertical axis) represents the electromotive force. The two-dimensional map shows SOCs at intersections in the vertical axis and the horizontal axis. The specified SOC is estimated to be the second SOC. This two-dimensional map is also stored in the storage unit 6.

In the above example, the representative battery block is selected to calculate the OCV. However, the present invention is not limited in such a manner. For example, the no-load voltage of the entire rechargeable battery may be calculated, and the electromotive force of the entire rechargeable battery may be calculated from the no-load voltage to estimate the second SOC.

A method for controlling output of the rechargeable battery according to the first embodiment of the present invention will now be described with reference to FIG. 5. The method for controlling the output of the rechargeable battery in the first embodiment is used by the battery ECU 1.

Figure 5:
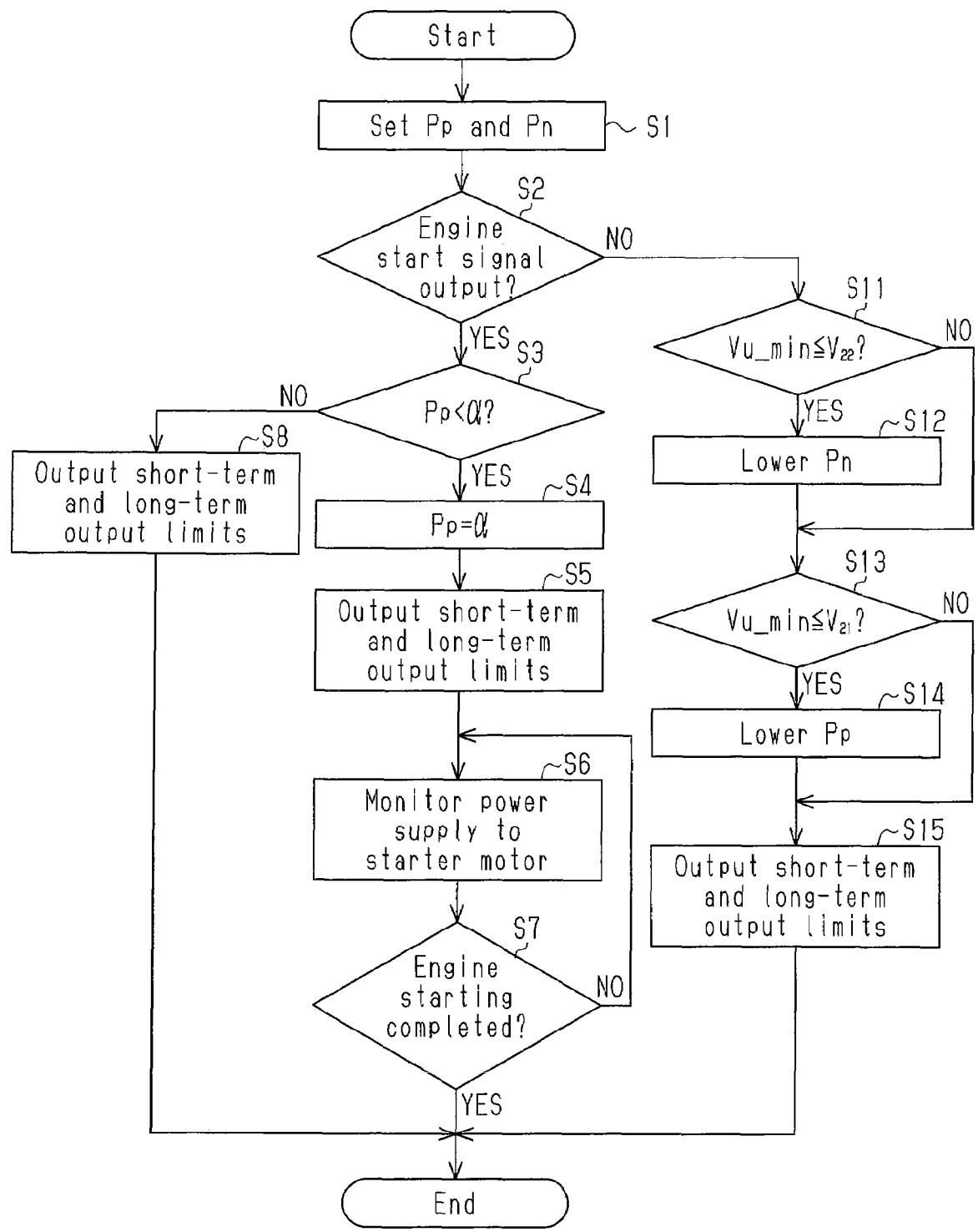
FIG. 5 is a flowchart showing a method for controlling output of a rechargeable battery in the first embodiment.

As shown in FIG. 5, the upper-limit setting unit 7 first sets the short-term output upper limit Pp and the long-term output upper limit Pn based on the lowest battery temperature of the rechargeable battery 40 and the SOC estimated by the calculation unit 8 (step S1). Next, the upper-limit setting unit 7 determines whether the vehicle ECU 20 is outputting the engine start signal (step S2). When the engine start signal is being output, the upper-limit setting unit 7 sets the engine start flag ON (FLG=1) and proceeds to step S3 and the subsequent steps.

In step S3, the upper-limit setting unit 7 determines whether the short-term output upper limit Pp is less than the power value α. When the short-term output upper limit Pp is greater than or equal to the power value α required to drive the starter motor 38, the short-term output upper limit Pp does not have to be reset. In this case, the communication unit 9 outputs the short-term output upper limit Pp set in step S1 and the long-term output upper limit Pn set in step S1 to the vehicle ECU 20 as the short-term output information and the long-term output information (step S8).

When the short-term output upper limit Pp is less than the power value α, the upper-limit setting unit 7 resets the short-term output upper limit Pp, and raises the short-term output upper limit Pp to the power value α required to drive the starter motor 38 (step S4). When doing so, the upper-limit setting unit 7 rewrites the short-term output information.

Next, the communication unit 9 provides the short-term output upper limit Pp reset in step S4 and the long-term output upper limit Pn set in step S1 to the vehicle ECU 20 as the short-term output information and the long-term output information (step S5).

When step S5 is performed, power is supplied to the starter motor 38. However, the short-term output upper limit Pp set in step S1 is determined as being less than the power value α in step S3. Thus, the rechargeable battery 40 is in a low temperature environment and may easily deteriorate. In this case, the monitoring unit 10 monitors the power supply from the rechargeable battery 40 to the starter motor 38 (step S6). The processing in step S7 will be described in detail later.

Afterwards, the monitoring unit 10 determines whether a start completion signal indicating that the engine 24 is completely started has been received from the vehicle ECU 20 (step S7). When the start completion signal has not been received, the processing in step S7 is performed again. When the start completion signal has been received, the monitoring unit 10 terminates the output control process.

When the engine start signal is not being output (FLG=0) in step S2, the engine 24 has been already started and the vehicle has been activated. In this case, the upper-limit setting unit 7 performs step S11 and the subsequent steps.

In step S11, the upper-limit setting unit 7 determines whether the minimum terminal voltage Vu_min is less than or equal to the second reference voltage $V_{22}$. When the minimum terminal voltage Vu_min exceeds the second reference voltage $V_{22}$, the upper-limit setting unit 7 performs step S13. When the minimum terminal voltage Vu_min is less than or equal to the second reference voltage $V_{22}$, the upper-limit setting unit 7 lowers the long-term output upper limit Pn to suppress decrease in the terminal voltage (step S12) and then performs step S13.

In step S13, the upper-limit setting unit 7 determines whether the minimum terminal voltage Vu_min is less than or equal to the first reference voltage $V_{21}$. When the minimum terminal voltage Vu_min exceeds the first reference voltage $V_{21}$, the upper-limit setting unit 7 performs step S15. When the minimum terminal voltage Vu_min is less than or equal to the first reference voltage $V_{21}$, the upper-limit setting unit 7 lowers the short-term output upper limit Pp (step S14) and then performs step S15.

In step S15, the communication unit 9 provides the short-term output information and the long-term output information to the vehicle ECU 20. This ends the processing.

In the first embodiment, when starting the engine 24, the starting of the engine 24 is enabled only when predetermined requirements are satisfied. When the terminal voltage of the rechargeable battery 40 decreases after the vehicle is activated (after the engine 24 is started), the short-term output upper limit Pp and the long-term output upper limit Pn are lowered to suppress decrease in the terminal voltage of the rechargeable battery 40. The control circuit 5 is programmed to perform the output control process shown in FIG. 5 at a constant frequency (e.g., every 100 ms).

Figure 6:
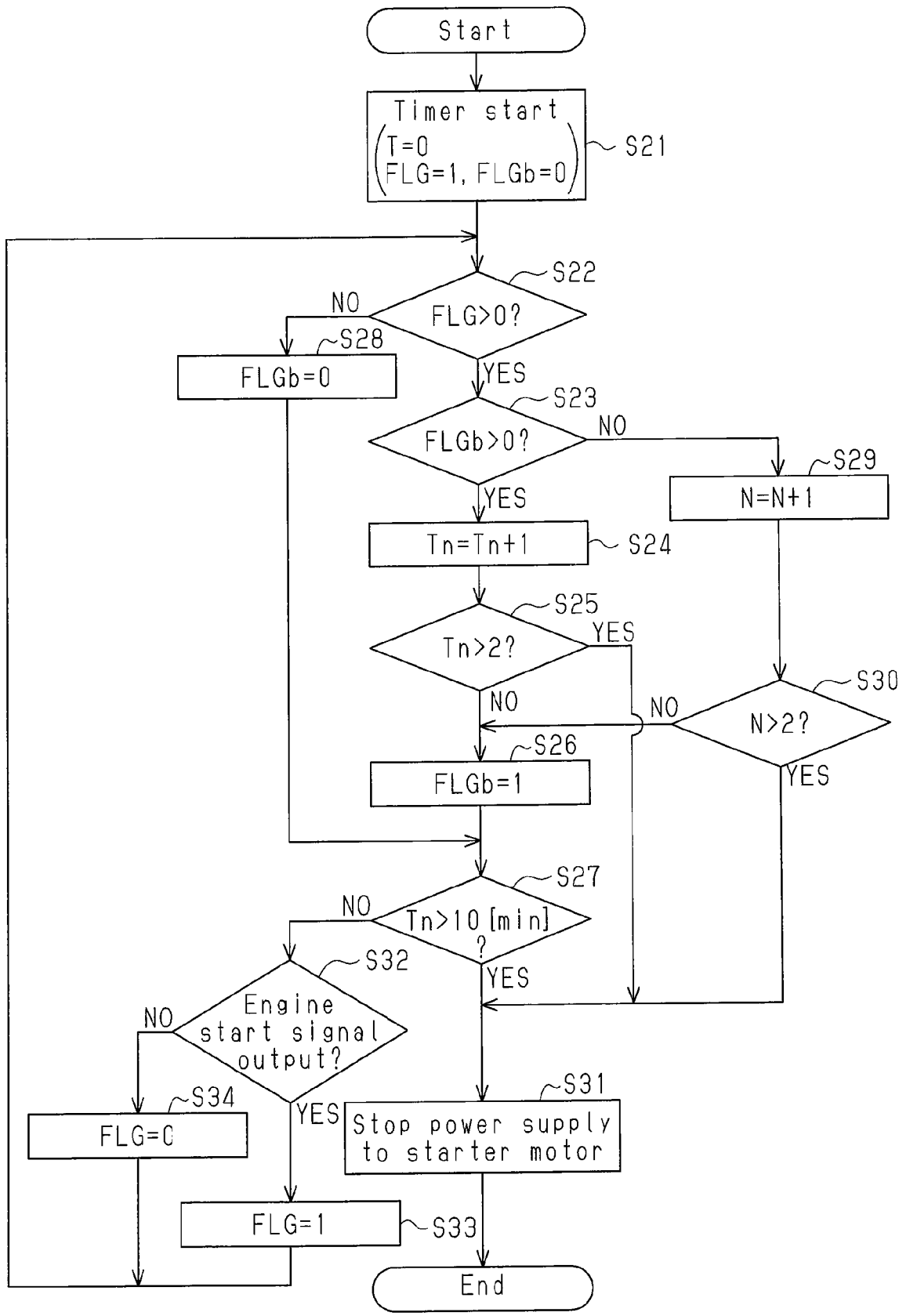
FIG. 6 is a flowchart showing a process of monitoring power supply to a starter motor.

Step S7, which is shown in FIG. 5, will now be described in detail with reference to FIG. 6. FIG. 6 is a flowchart showing a process performed when the power supply to the starter motor is monitored. The power supply monitoring process of FIG. 6 is performed by the monitoring unit 10 shown in FIG. 2. FIGS. 1 and 2 will also be referred to in the following description of the power supply monitoring process. In the example of FIG. 6, the power supply occurrences has a set upper limit of two, the power supply time for each power supply occurrence has a set upper limit of two seconds, and the elapsed time has a set upper limit of ten minutes. However, these upper limits are not limited to the values of the example shown in FIG. 6.

As shown in FIG. 6, when step S6, which is shown in FIG. 5, is completed, the monitoring unit 10 sets a total time T to zero and starts the timer (step S21). In this state, the engine start flag is set, that is, FLG=1 is satisfied. A flag FLGb is used in the loop process of step S22 and the subsequent steps to indicate whether the engine start flag has been set in a previous loop. In step S21, the flag FLGb is zero.

The monitoring unit 10 determines whether the engine start flag has been set, that is, whether FLG>0 (step S22) is satisfied. When the engine start flag has not been set, that is, when FLG≦0 is satisfied, the flag FLGb is set to zero (step S28) and step S27 is performed.

When the engine start flag has been set (FLG=1), the monitoring unit 10 determines whether the flag FLG was set at 1 in the previous loop, that is, whether FLGb>0 is satisfied (step S23).

When FLGb>0 is not satisfied, the monitoring unit 10 adds one to the parameter indicating the occurrences of power supply to the starter motor 38 (occurrences N: initial value being zero) (step S29). Next, the monitoring unit 10 determines whether the occurrences N is greater than 2 (step S30).

When the occurrences N is less than or equal to 2, the monitoring unit 10 sets FLGb=1 (step S26) and then executes the processing in step S27. When the occurrences N is greater than 2, the power supply operation number exceeds its upper limit. Thus, the monitoring unit 10 stops the power supply from the rechargeable battery 40 to the starter motor 38 (step S31). The monitoring unit 10 terminates the power supply monitoring process and the output control process shown in FIG. 5.

When FLGb>0 is satisfied in step S23, the monitoring unit 10 adds one to the parameter indicating the power supply time of one occurrence of the power supply to the starter motor 38 (time Tn: initial value being zero). Next, the monitoring unit 10 determines whether the time Tn is greater than 2 (step S25).

When the time Tn is less than or equal to 2, the monitoring unit 10 sets FLGb=1 (step S26) and performs step S27. When the time Tn is greater than 2, the power supply time of one power supply occurrence exceeds its upper limit. Thus, the monitoring unit 10 performs step S31 to stop power supply from the rechargeable battery 40 to the starter motor 38. The monitoring unit 10 terminates the power supply monitoring process, and also terminates the output control process shown in FIG. 5.

In step S27, the monitoring unit 10 determines whether the total time T exceeds 10 minutes. When the total time T exceeds 10 minutes, the elapsed time of power supply exceeds its upper limit. Thus, the monitoring unit 10 performs step S31 to stop the power supply from the rechargeable battery 40 to the starter motor 38. The monitoring unit 10 then terminates the power supply monitoring process and the output control process shown in FIG. 5.

When the total time T is less than or equal to 10 minutes, the monitoring unit 10 instructs the upper-limit setting unit 7 to determine whether the engine start signal is still being output from the vehicle ECU 20 (step S32). Step S32 is the same as step S2 shown in FIG. 5.

When the engine start signal is still being output, the monitoring unit 10 instructs the upper-limit setting unit 7 to set the engine start flag ON (FLG=1) (step S33). When the engine start signal is not being output, the monitoring unit 10 instructs the upper-limit setting unit 7 to unset the engine start flag OFF (FLG=0) (step S34). Afterwards, the monitoring unit 10 performs step S22 and the subsequent steps.

In the example of FIG. 6, the time required for a loop process from when step S22 is performed to when step S22 is performed again is set at one second. However, the time of the loop process should not be limited to one second. The process shown in FIG. 6 may be performed separately from the process shown in FIG. 5. This prevents unnecessary draining of the rechargeable battery 40 when the engine is abnormal and cannot be started. In this case, the upper limits for the power supply occurrences, the power supply time for each power supply occurrence, and the elapsed time may be set to values differing from the above-described values.

As described above in the first embodiment, even when the short-term output upper limit Pp is less than the power value α, the minimum power required to start the engine is ensured. Thus, even when the terminal voltage of the rechargeable battery decreases under low temperatures in the first embodiment, power is supplied to the starter motor 38. This ensures the starting of the engine.

In the first embodiment, the starter motor 38 is not intermittently turned on and off. Thus, unlike in the prior art, the discharge voltage of the rechargeable battery does not repeatedly increase and decrease within a short period of time. When the short-term output upper limit Pp is set equal to the power value α as shown in FIG. 4, the terminal voltage of the rechargeable battery 40 decreases. However, the damage of the rechargeable battery 40 inflicted by this decrease in the terminal voltage is smaller than the damage of the rechargeable battery inflicted in the prior art. Thus, compared with the prior art, deterioration in the rechargeable battery of the first embodiment is more suppressed.

In the first embodiment, the monitoring unit 10 monitors the power supply to the starter motor 38. This further prevents deterioration of the rechargeable battery. In the first embodiment, when the terminal voltage of the rechargeable battery decreases after the vehicle is activated, either one or both of the short-term output upper limit Pp and the long-term output upper limit Pn is lowered. As a result, the rechargeable battery is prevented from deteriorating even after the vehicle is activated.

In the prior art, power is supplied to the starter motor only after the terminal voltage of the rechargeable battery increases to or above the minimum voltage. Thus, the engine may not be started in some cases. Such a case is avoided in the first embodiment since the terminal voltage of the rechargeable battery is not a requirement that must be satisfied to start the engine.

The processes shown in FIG. 5 and FIG. 6 may be provided as computer programs. The computer programs may be installed in a microcomputer included in the battery ECU 1 and be executed by a central processing unit (CPU) incorporated in the control circuit 5. In this case, the voltage measurement unit 4 may be formed by a connection circuit of the voltage sensor and the CPU, the current measurement unit 2 may be formed by a connection circuit of the current sensor 44 and the CPU, the temperature measurement unit 3 may be formed by a connection circuit of the temperature sensor 43 and the CPU, and the storage unit 6 may be formed by a memory incorporated in the microcomputer.

When the electric vehicle is an HEV, the vehicle ECU may also function as the battery ECU. In this case, the battery ECU 1 of the first embodiment may be realized by installing programs of the processes shown in FIG. 5 and FIG. 6 into a microcomputer forming the vehicle ECU 20 and executing the programs.

A rechargeable battery controller and a method for controlling output of a rechargeable battery according to a second embodiment of the present invention will now be described with reference to FIG. 7.

The rechargeable battery controller of the second embodiment will first be described. The rechargeable battery controller (battery ECU) of the second embodiment differs from the rechargeable battery controller of the first embodiment in the processing performed by a upper-limit setting unit 7. The remaining structure of the rechargeable battery controller of the second embodiment is the same as the structure of the first embodiment.

When the engine is started, the upper-limit setting unit 7 in the second embodiment resets (raises) the set upper limits when the third requirement described below is satisfied in addition to the above first and second requirements. The second embodiment differs from the first embodiment in this point. The short-term output upper limit Pp is reset also in the second embodiment.

The third requirement is that the terminal voltage of the rechargeable battery 40 is greater than or equal to the reference voltage $V_1$ (refer to FIG. 4). The upper-limit setting unit 7 compares the minimum terminal voltage Vu_min with the reference voltage $V_1$, and determines that the third requirement is satisfied when the minimum terminal voltage Vu_min is greater than or equal to the reference voltage $V_1$.

In the second embodiment, the storage unit also stores a map showing the relationship between the temperature and the optimum reference voltage $V_1$. The upper-limit setting unit 7 locates the lowest battery temperature and sets the reference voltage $V_1$ by comparing this temperature with a map. The map is also generated to reflect the capacity or load the rechargeable battery 40 based on the results of discharging experiments conducted in advance. To determine the reference voltage $V_1$ when generating the map, a critical voltage ($V_{21}$) that does not affect the life of each battery cell is first obtained through discharging experiments. A margin is then added to the critical voltage in a manner that none of the battery cells changes its poles. The margin is set to consider variations between the battery cells and also to consider the effects that are caused when the battery cells are left unused.

The method for controlling output of the rechargeable battery in the second embodiment will now be described. The rechargeable battery output control method according to the second embodiment is used by the battery ECU 1. In FIGS. 5 and 7, like steps are given the same reference numerals.

Figure 7:
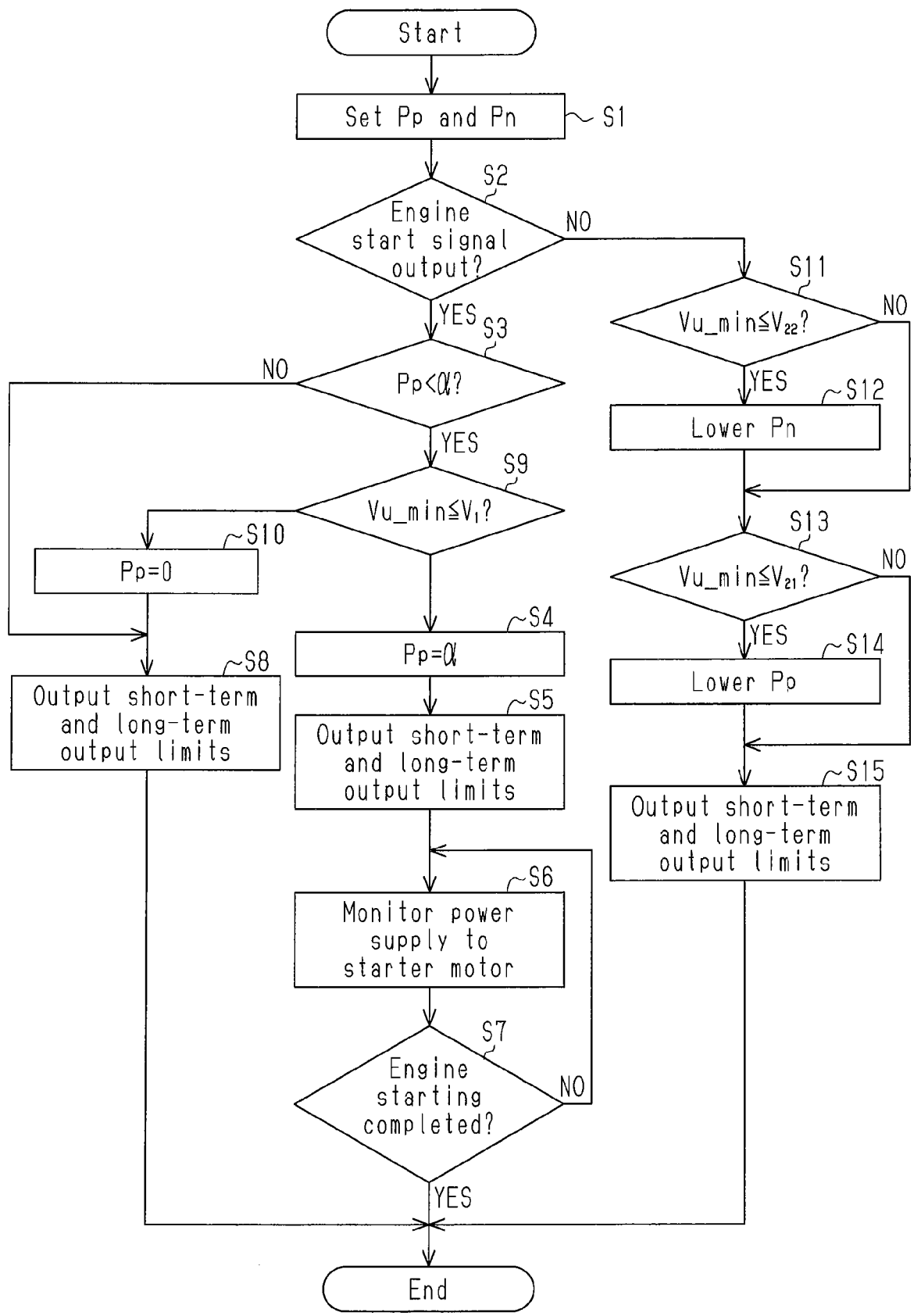
FIG. 7 is a flowchart showing a method for controlling output of a rechargeable battery according to a second embodiment of the present invention.

As shown in FIG. 7, the upper-limit setting unit 7 performs the processing in steps S1 to S3 in the same manner as in the first embodiment. When the short-term output upper limit Pp is determined as being greater than or equal to the power value α required to drive the starter motor in step S3, the communication unit outputs the short-term output upper limit Pp set in step S1 and the long-term output upper limit Pn set in step S1 to the vehicle ECU as the short-term output information and the long-term output information.

When the short-term output upper limit Pp is less than the power value α, the upper-limit setting unit 7 further determines whether the minimum terminal voltage Vu_min is greater than or equal to the reference voltage $V_1$ (step S9). When the minimum terminal voltage Vu_min is less than the reference voltage $V_1$, the rechargeable battery may deteriorate if power is supplied to the starter motor. In this case, the upper-limit setting unit 7 resets the short-term output upper limit Pp to zero and rewrites the short-term output information (step S10).

Afterwards, step S8 is performed and the communication unit outputs the short-term output upper limit Pp reset in step S10 and the long-term output upper limit Pn set in step S1 to the vehicle ECU as the short-term output information and the long-term output information.

When the shortest terminal voltage Vu_min is greater than or equal to the reference voltage $V_1$, the upper-limit setting unit 7 resets the short-term output upper limit Pp in the same manner as in the first embodiment and raises the short-term output upper limit Pp to the power value α required to drive the starter motor (step S4). The upper-limit setting unit 7 rewrites the short-term output information. Further, the upper-limit setting unit 7 performs the processing in steps S5 to S7 in the same manner as in the first embodiment. When the engine start signal is not being output (FLG=0) in step S2, the engine has already been started and the vehicle has been activated. Thus, the upper-limit setting unit 7 performs the processing in steps S11 to S15 in the same manner as in the first embodiment.

As described above in the second embodiment, even when the short-term output upper limit Pp is less than the power value α, the minimum power required to start the engine is ensured in the same manner as in the first embodiment. This ensures starting of the engine. Like in the first embodiment, the starter motor is not turned on and off intermittently. Thus, deterioration of the rechargeable battery is further prevented as compared with the prior art.

Further, the reference voltage $V_1$ is set in the second embodiment. When the shortest terminal voltage V_min of the rechargeable battery is less than the reference voltage $V_1$, power is not supplied to the starter motor. Thus, deterioration of the rechargeable battery in the second embodiment is further prevented as compared with the first embodiment.

In the second embodiment, the battery ECU may be realized by installing a program of the processes shown in FIG. 7 to a microcomputer and executing the programs.

A rechargeable battery controller and a method for controlling output of a rechargeable battery according to a third embodiment of the present invention will now be described with reference to FIGS. 8 and 9. The rechargeable battery controller (battery ECU) of the third embodiment differs from the rechargeable battery controller of the first embodiment in the processing performed by the upper-limit setting unit 7. The remaining structure of the rechargeable battery controller of the third embodiment is the same as the first embodiment.

In the third embodiment, the upper-limit setting unit 7 resets (raises) the set upper limits when the fourth requirement described below is satisfied in addition to the first and second requirements during the starting of the engine. The third embodiment differs from the first embodiment in this point. The short-term output upper limit Pp is also reset in the third embodiment.

The fourth requirement is that the SOC of the rechargeable battery 40 is greater than or equal to the reference SOV. The upper-limit setting unit 7 compares the SOC estimated by the calculation unit with the reference SOC and determines that the fourth requirement is satisfied when the SOC estimated by the calculation unit is greater than or equal to the reference SOC. The reference SOC is exemplified as REF in FIGS. 8 and 9, which will be described later.

In the third embodiment, the storage unit also stores a map showing the relationship between the temperature and the optimum SOC. The upper-limit setting unit 7 locates the lowest battery temperature and sets the reference SOC by comparing the temperature and the map. The map is also generated to reflect the performance of the rechargeable battery 40 or the load of the rechargeable battery 40 based on the results of discharging experiments conducted in advance. To determine the reference SOC when generating the map, a critical SOC that does not affect the life of each battery cell is first obtained through discharging experiments. A margin is then added to the critical SOC in a manner that none of the battery cells changes its poles. The margin is set to consider variations between the battery cells and also to consider effects that are caused when the battery cells are left unused.

A method for controlling output of the rechargeable battery in the third embodiment will now be described with reference to FIGS. 8 and 9. The rechargeable battery output control method of the third embodiment is used by the battery ECU 1. In FIGS. 8 and 5, like steps are given the same reference numerals.

Figure 8:
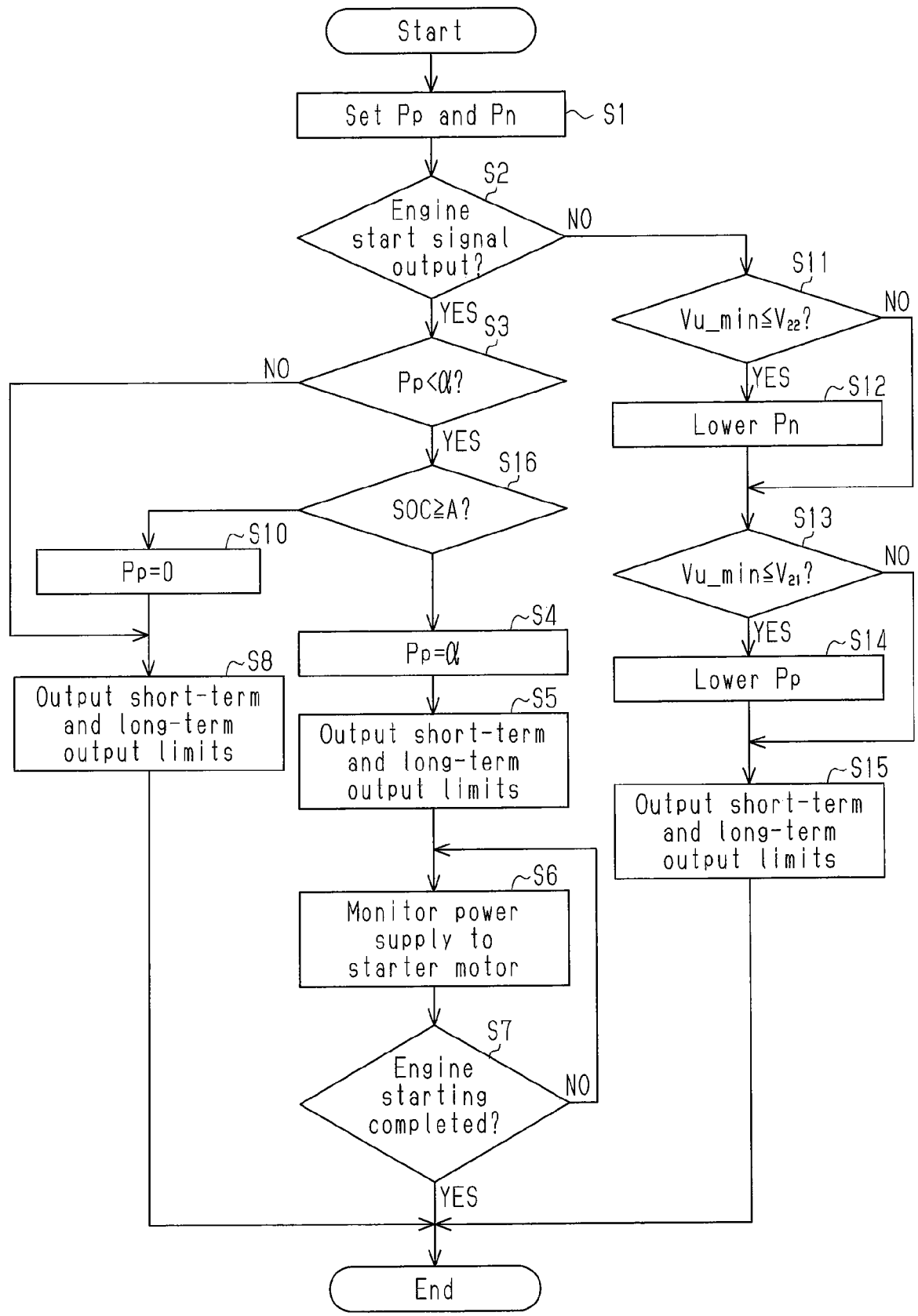
FIG. 8 is a flowchart showing a method for controlling output of a rechargeable battery according to a third embodiment of the present invention.

As shown in FIG. 8, the upper-limit setting unit 7 first performs steps S1 to S3 in the same manner as in the first embodiment. When the short-term output upper limit Pp is determined as being greater than or equal to the power value α required to drive the starter motor in step S3, the communication unit outputs the short-term output upper limit Pp set in step S1 and the long-term output upper limit Pn set in step S1 to the vehicle ECU as the short-term output information and the long-term output information.

When the short-term output upper limit Pp is less than the power value α, the upper-limit setting unit 7 further determines whether the SOC of the rechargeable battery is greater than or equal to the reference SOC (REF) (step S16). When the SOC of the rechargeable battery is less than the reference SOC (REF), the upper-limit setting unit 7 resets the short-term output upper limit Pp to zero in the same manner as in the second embodiment and rewrites the short-term output information (step S10).

After step S10 is performed, step S8 is performed. As a result, the communication unit outputs the short-term output upper limit Pp reset in step S10 and the long-term output upper limit Pn set in step S1 to the vehicle ECU as the short-term output information and the long-term output information.

When the SOC of the rechargeable battery estimated by the calculation unit is greater than or equal to the reference SOC (REF), the upper-limit setting unit 7 resets the short-term output upper limit Pp in the same manner as in the first embodiment as shown in FIG. 9 and raises the value of the short-term output upper limit Pp to the power value α required to drive the starter motor (step S4). Here, the upper-limit setting unit 7 rewrites the short-term output information. Further, the upper-limit setting unit 7 performs steps S5 to S7 in the same manner as in the first embodiment. When the engine start signal is not being output (FLG=0) in step S2, the engine has been already started and the vehicle has been activated. In this case, the upper-limit setting unit 7 performs steps S11 to S15 in the same manner as in the first embodiment.

As described above in the third embodiment, even when the short-term output upper limit Pp is less than the power value α, the minimum power required to start the engine is ensured like as in the first embodiment. This ensures the starting of the engine. In the first embodiment, the starter motor is not turned on and off intermittently. Thus, deterioration of the rechargeable battery is further prevented as compared with the prior art.

Further, the reference SOC is set in the third embodiment. When the SOC of the rechargeable battery is less than the reference SOC, power is not supplied to the starter motor. This further prevents deterioration of the rechargeable battery as compared with the first embodiment.

In the third embodiment, the battery ECU may be realized by installing programs of the processes shown in FIG. 8 on a microcomputer and executing the programs.

The rechargeable battery output controller and the rechargeable battery output control method of the present invention are applicable to any rechargeable battery for supplying power to a starter motor of a vehicle and are applicable not only to an HEV but also to an automobile using a normal engine.

It should be apparent to those skilled in the art that the present invention may be embodied in many other specific forms without departing from the spirit or scope of the invention. Therefore, the present examples and embodiments are to be considered as illustrative and not restrictive, and the invention is not to be limited to the details given herein, but may be modified within the scope and equivalence of the appended claims.

What is claimed is:

1. A rechargeable battery controller for controlling output of a rechargeable battery mounted on a vehicle having a power source including an internal combustion engine, a starter motor for starting the internal combustion engine, and a vehicle controller, the rechargeable battery controller comprising:
   a control circuit connectable in communication with the vehicle controller, in which the control circuit sets an upper limit for discharge power output by the rechargeable battery in a set period of time and communicates the upper limit to the vehicle controller;
   wherein the control circuit resets the upper limit to a value greater than or equal to a power value required to drive the starter motor when a first requirement in which power supply from the rechargeable battery to the starter motor is scheduled and a second requirement in which the upper limit is less than the power value required to drive the starter motor are both satisfied.

2. The-rechargeable battery controller according to claim 1, further comprising:
   a voltage measurement unit for measuring terminal voltage of the rechargeable battery;
   wherein the control circuit resets the upper limit to a value greater than or equal to the power value required to drive the starter motor when a third requirement in which the terminal voltage measured by the voltage measurement unit is greater than or equal to a reference voltage.

3. The rechargeable battery controller according to claim 1, wherein the control circuit:
   estimates a state of charge of the rechargeable battery; and
   resets the set upper limit to a value greater than or equal to the power value required to drive the starter motor when a fourth requirement in which the estimated state of charge of the rechargeable battery is greater than or equal to a preset reference state of charge is satisfied.

4. The rechargeable battery controller according to claim 1, wherein the power source further includes a motor, and the rechargeable battery is adapted to supply power to at least the starter motor and the motor.

5. The rechargeable battery controller according to claim 1, further comprising:
   a voltage measurement unit for measuring terminal voltage of the rechargeable battery;
   wherein the control circuit lowers the upper limit when the terminal voltage measured by the voltage measurement unit decreases to a relatively low reference voltage.

6. The rechargeable battery controller according to claim 5, wherein the control circuit:
   sets, as the upper limit, a first upper limit, which is associated with a relatively short set time, and a second upper limit, which is associated with a relatively long set time and is less than the first upper limit;
   sets the relatively low reference voltage as each of the first upper limit and the second upper limit; and
   lowers one of the first and second upper limits when the terminal voltage measured by the voltage measurement unit decreases to the relatively low reference voltage associated to the one of the first and second upper limits; and
   resets the first upper limit to a value greater than or equal to the power value required to drive the starter motor when the first requirement and a second requirement, in which the first upper limit is less than the power value required to drive the starter motor, are both satisfied.

7. The rechargeable battery controller according to claim 1, further comprising:
   a memory for storing an upper limit set for at least one of a number of occurrences of power supply to the starter motor, time for each power supply occurrence, and time elapsed from when power supply to the starter motor starts to occur for the first time;
   wherein the control circuit is controlled to:
      measure at least one of the power supply occurrences, the power supply time, and the elapsed time; and
      suspend power supply from the rechargeable battery to the starter motor when the measured value exceeds the associated upper limit stored in the memory.

* * * * *